United States Patent
Fukuhara et al.

(10) Patent No.: US 11,208,550 B2
(45) Date of Patent: Dec. 28, 2021

(54) POLYVINYL ALCOHOL COMPOSITION AND USE THEREOF

(71) Applicant: KURARAY CO., LTD., Kurashiki (JP)

(72) Inventors: Tadahito Fukuhara, Kurashiki (JP); Keisuke Morikawa, Kurashiki (JP); Taeko Kaharu, Kurashiki (JP)

(73) Assignee: Kuraray Co., Ltd., Okayama (JP)

( * ) Notice: Subject to any disclaimer, the term of this patent is extended or adjusted under 35 U.S.C. 154(b) by 252 days.

(21) Appl. No.: 16/473,773

(22) PCT Filed: Dec. 27, 2017

(86) PCT No.: PCT/JP2017/047105
§ 371 (c)(1),
(2) Date: Jun. 26, 2019

(87) PCT Pub. No.: WO2018/124241
PCT Pub. Date: Jul. 5, 2018

(65) Prior Publication Data
US 2019/0338115 A1  Nov. 7, 2019

(30) Foreign Application Priority Data

Dec. 28, 2016 (JP) .............................. JP2016-256531
Mar. 30, 2017 (JP) .............................. JP2017-068722

(51) Int. Cl.
| C08L 29/04 | (2006.01) |
| C08F 2/20 | (2006.01) |
| C08F 2/44 | (2006.01) |
| C08F 216/06 | (2006.01) |
| C08K 5/053 | (2006.01) |
| D21H 19/60 | (2006.01) |
| D21H 27/00 | (2006.01) |

(52) U.S. Cl.
CPC ................ *C08L 29/04* (2013.01); *C08F 2/20* (2013.01); *C08F 2/44* (2013.01); *C08F 216/06* (2013.01); *C08K 5/053* (2013.01); *D21H 19/60* (2013.01); *D21H 27/001* (2013.01)

(58) Field of Classification Search
CPC ......... C08K 5/053; C08L 29/04; D21H 19/60; D21H 27/001
See application file for complete search history.

(56) References Cited

U.S. PATENT DOCUMENTS 5,576,370 A * 11/1996 Shimizu .................. C08F 2/004
524/413
6,022,932 A    2/2000  Ooura et al.

2003/0008972 A1 * 1/2003 Kato ........................ C08F 14/06
525/56
2004/0186232 A1  9/2004  Shibutani
2008/0176995 A1  7/2008  Ooura et al.
2009/0111940 A1 * 4/2009 Kato .......................... C08F 2/20
525/60
2016/0160446 A1  6/2016  Michel et al.
2017/0198068 A1  7/2017  Kozuka et al.

FOREIGN PATENT DOCUMENTS

| CN | 105556034 A | 5/2016 | |
| EP | 2154161 A1 | 2/2010 | |
| JP | 51-45189 | 4/1976 | |
| JP | H04-267185 A | 9/1992 | |
| JP | 6-206909 A | 7/1994 | |
| JP | 10-67806 A | 3/1998 | |
| JP | 10-95804 A | 4/1998 | |
| JP | 2000-170097 A | 6/2000 | |
| JP | 2002-30104 A | 1/2002 | |
| JP | 2004-250695 A | 9/2004 | |
| JP | 2005-48024 A | 2/2005 | |
| JP | 2005-194672 A | 7/2005 | |
| JP | 2013-531136 A1 | 8/2013 | |
| TW | 588055 | 5/2004 | |
| WO | WO 2007/119735 A1 | 10/2007 | |
| WO | WO 2011/104427 A1 | 9/2011 | |
| WO | 2015/004017 A1 | 1/2015 | |
| WO | WO-2015037683 A1 * | 3/2015 | ............. D21H 19/60 |
| WO | WO 2015/182567 A1 | 12/2015 | |

OTHER PUBLICATIONS

U.S. Appl. No. 16/473,682, filed Jun. 26, 2019, Tadahito Fukuhara.
Search Report dated Nov. 29, 2019 in corresponding Taiwanese Patent Application No. 106146150 (with English Translation of Category of Cited Documents), 2 pages.
International Search Report dated Feb. 20, 2018 in PCT/JP2017/047105 filed Dec. 27, 2017.
Extended European Search Report issued in corresponding European Patent Application No. 17887499.6 dated Jul. 1, 2020.

* cited by examiner

*Primary Examiner* — Mark S Kaucher
(74) *Attorney, Agent, or Firm* — Morgan, Lewis & Bockius LLP

(57) ABSTRACT

There is provided a composition (C) comprising a modified PVA (A) and a compound (B), wherein the modified PVA (A) contains 0.01 mol % or more and less than 2 mol % of double bonds derived from an unsaturated carboxylic acid or a derivative thereof in side chains; the compound (B) is a compound having a conjugated double bond and two or more hydroxy groups bonded to the conjugated double bond, or a salt or oxide thereof; and a content of the compound (B) in the composition (C) is 0.001 parts by mass or more and less than 5 parts by mass based on 100 parts by mass of the modified PVA (A). The composition (C) has excellent hue, contains less insolubles in water, and has excellent water solubility.

20 Claims, No Drawings

POLYVINYL ALCOHOL COMPOSITION AND USE THEREOF

TECHNICAL FIELD

The present invention relates to a composition (C) containing a modified polyvinyl alcohol (A) and a compound (B). The present invention also relates to a dispersion stabilizer for suspension polymerization of a vinyl compound containing the composition (C). The present invention further relates to a coating agent consisting of an aqueous solution containing the modified polyvinyl alcohol (A) and the compound (B).

BACKGROUND ART

Polyvinyl alcohols (hereinafter, sometimes abbreviated as "PVA") have been used for various products such as an adhesive, a paper coating agent, a polarizing film, a water-soluble film, a medicine, a cosmetic composition, and a dispersion stabilizer for suspension polymerization of a vinyl compound (for example, vinyl chloride). In many products, a PVA is less colored and is white, resulting in increasing an additional value of product. It is further known that the presence of a reactive group such as a double bond in a PVA can improve a variety of performances or provide special effects.

PVAs are extensively used as a dispersion stabilizer for suspension polymerization of a vinyl compound (Patent Reference Nos. 1 to 5).

It has been proposed that a heat-treated PVA is used for a polymerization reaction in order to improve stability during polymerization of vinyl chloride (polymerization stability) (Patent Reference Nos. 1 to 3). However, the use of such a PVA as a dispersion stabilizer in suspension polymerization of a vinyl chloride has not been satisfactorily effective in terms of polymerization stability. Furthermore, such a conventional PVA has very bad hue, thus leading to bad hue of a vinyl polymer produced.

Patent Reference No. 4 has described a dispersion stabilizer for suspension polymerization containing a polyvinyl alcohol having double bonds in side chains produced by acetalizing a polyvinyl alcohol by a monoaldehyde having an olefinic unsaturated double bond. The use of a dispersion stabilizer for suspension polymerization as described in Patent Reference No. 4 in a polymerization reaction is effective to some degree for improvement of hue, but not satisfactorily effective for polymerization stability or plasticizer absorbability of a vinyl polymer produced.

Furthermore, an acid is used in producing a polyvinyl alcohol described in Patent Reference No. 4, so that an expensive facility which is acid-resistant is required. Furthermore, a monoaldehyde having a double bond used for producing the polyvinyl alcohol has problems; for example, it is expensive, unstable in the air, sometimes specified as a poison, less handleable due to irritating smell and starting materials are less available.

Patent Reference No. 5 has described a dispersion stabilizer consisting of a polyvinyl alcohol having double bonds in side chains produced by esterifying a polyvinyl alcohol with a carboxylic acid having an unsaturated double bond or a salt thereof. It has described that the polyvinyl alcohol used for the dispersion stabilizer can be produced by a convenient method using an inexpensive carboxylic acid.

However, a polyvinyl alcohol having double bonds in side chains which is produced by a conventional method unsatisfactorily improves hue, and, therefore, when a vinyl compound is polymerized using a dispersion stabilizer consisting of the polyvinyl alcohol, hue of a vinyl polymer produced is insufficiently improved. Furthermore, a dispersion stabilizer described in Patent Reference No. 5 contains water, so that when a vinyl compound is suspension-polymerized using this dispersion stabilizer, fisheyes are formed in a vinyl polymer obtained.

A PVA is a unique synthetic polymer which is hydrophilic and crystalline, and is used, in a paper industry, as a paper strengthening agent, a dispersant for a fluorescent white pigment and a binder for an inorganic compound (calcium carbonate, clay, silica and so on). Furthermore, since a PVA has a good film-formability, a paper can have gas-barrier properties and oil resistance by coating the paper with the PVA. A paper coated with a PVA may be used as a barrier paper, and a representative example of a barrier paper is a base paper for release paper. A base paper for release paper is generally produced by coating the surface of a cellulose substrate with a PVA. Then, a release layer (silicone layer) can be formed on the surface of the base paper for release paper to provide a release paper. A PVA in a release paper plays a role of a sealer which prevents expensive silicone or platinum from permeating a base paper. Recently, there has been needed a coating agent, in addition to such sealability, which can accelerate curing of a silicone in a release layer and improve adhesiveness between a PVA layer and a silicone layer.

Patent Reference No. 6 has described a base paper for release paper coated with a PVA having a silyl group which satisfies particular conditions. Coating with such a PVA can provide a base paper for release paper having good sealability. However, it does not satisfactorily accelerate curing of a silicone or improve adhesiveness between a substrate and a silicone layer.

Patent Reference No. 7 has described a cellulose substrate coated with a PVA having double bonds in side chains by acetalization. Generally, acetalization is carried out using a volatile acid such as hydrochloric acid and nitric acid and when an acetalized PVA contains such a residual acid, the acid causes corrosion of instruments during coating. It has been desired to solve the problem. Furthermore, the PVA is insufficiently effective for accelerating curing of a silicone in a release layer.

PRIOR ART REFERENCES

Patent References

Patent Reference No. 1: JP 51-45189 A
Patent Reference No. 2: JP 10-67806 A
Patent Reference No. 3: JP 2004-250695 A
Patent Reference No. 4: WO 2015/182567 A1
Patent Reference No. 5: WO 2007/119735 A1
Patent Reference No. 6: JP 2005-194672 A
Patent Reference No. 7: JP 2013-531136 A

SUMMARY OF THE INVENTION

Problems to be Solved by the Invention

To solve the above problems, an objective of the present invention is to provide a composition containing a polyvinyl alcohol having excellent hue and higher water solubility; a production method therefor; and a powder consisting of the composition.

Another objective of the present invention is to provide a dispersion stabilizer for suspension polymerization making suspension polymerization of a vinyl compound highly stable while preventing coloring of a polymer obtained and fisheyes in the polymer.

Further objective of the present invention is to provide a coating agent highly improving silicone sealability and water resistance of a base paper for release paper, capable of accelerating curing a silicone in a release layer and improving adhesiveness between a substrate and a release layer, and to provide a production method therefor.

Means for Solving the Problems

After intensive investigation for solving the above problems, the inventors have found that the above problems can be solved by providing a composition (C) containing a modified polyvinyl alcohol (A) having double bonds derived from an unsaturated carboxylic acid or a derivative thereof in side chains in a particular amount, and a particular compound (B) and have achieved the present invention.

The above problems are solved by providing a composition (C) comprising a modified polyvinyl alcohol (A) and a compound (B), wherein the modified polyvinyl alcohol (A) contains 0.01 mol % or more and less than 2 mol % of double bonds derived from an unsaturated carboxylic acid or a derivative thereof in side chains;

the compound (B) is a compound having a conjugated double bond and two or more hydroxy groups bonded to the conjugated double bond, or a salt or oxide thereof; and a content of the compound (B) in the composition (C) is 0.001 parts by mass or more and less than 5 parts by mass based on 100 parts by mass of the modified polyvinyl alcohol (A).

Here, it is preferable that the compound (B) is a compound having two or more hydroxy groups bonded to a carbon constituting an aromatic ring, or a salt or oxide thereof. It is also preferable that the compound (B) is a compound having two or more hydroxy groups at α- and β-positions in an α,β-unsaturated carbonyl compound, or a salt or oxide thereof.

It is preferable that the modified polyvinyl alcohol (A) has a viscosity-average polymerization degree of 400 or more and less than 5000 and a saponification degree of 65 mol % or more. It is also preferable that the modified polyvinyl alcohol (A) further contains ethylene units in a main chain; and a content of the ethylene units is 1 mol % or more and 10 mol % or less. It is also preferable that the amount of 1,2-glycol bond in the modified polyvinyl alcohol (A) is less than 1.9 mol %.

The above problems can be solved by providing a method for producing the composition (C), comprising reacting a polyvinyl alcohol (D) with the unsaturated carboxylic acid or a derivative thereof in the presence of the compound (B).

A suitable embodiment of the present invention is a powder consisting of the composition (C), wherein a yellow index is less than 50.

Another suitable embodiment of the present invention is a dispersion stabilizer for suspension polymerization of a vinyl compound, comprising the composition (C).

The above problems can be also solved by providing a method for producing a vinyl polymer by suspension-polymerizing a vinyl compound in the presence of the composition (C) and a polyvinyl alcohol (E), wherein one of the modified polyvinyl alcohol (A) and the polyvinyl alcohol (E) is a polyvinyl alcohol with a saponification degree of 77 mol % or more and less than 97 mol % and a viscosity-average polymerization degree of 1500 or more and less than 5000, and the other is a polyvinyl alcohol with a saponification degree of 65 mol % or more and less than 77 mol % and a viscosity-average polymerization degree of 400 or more and less than 1500.

The above problems can be solved by providing a coating agent consisting of an aqueous solution containing the composition (C), and 200 parts by mass or more and 100,000 parts by mass or less of water based on 100 parts by mass of the modified polyvinyl alcohol (A).

The above problems can be solved by providing a method for producing the above coating agent, comprising the first step for reacting the polyvinyl alcohol (D) with the unsaturated carboxylic acid or a derivative thereof in the presence of the compound (B) to provide the composition (C) comprising the modified polyvinyl alcohol (A) and the compound (B); and the second step for dissolving the composition (C) obtained in the first step in water to produce the coating agent.

A suitable embodiment of the present invention is a coating agent for paper. Another suitable embodiment of the present invention is a base paper for release paper produced by coating a paper with the coating agent of the present invention. Another embodiment of the present invention is a release paper comprising the base paper, and a release layer formed on the surface of the base paper. Here, it is preferable that the release layer comprises an addition-type silicone (F) and platinum (G), and comprises 0.001 parts by mass or more and 0.05 parts by mass or less of platinum (G) based on 100 parts by mass of the addition-type silicone (F).

Effects of the Invention

A composition (C) of the present invention has good hue, contains less water insolubles, and has excellent water solubility. In suspension polymerization of a vinyl compound, a dispersion stabilizer for suspension polymerization containing a composition (C) of the present invention can be used to stabilize the polymerization reaction and to reduce formation of coarse particles. Furthermore, in a polymer obtained, coloring and fisheyes can be prevented. A coating agent containing a composition (C) of the present invention can endow a base paper for release paper with excellent silicone sealability and water resistance, and can accelerate curing a silicone in a release layer and improve adhesiveness between a substrate and a release layer.

MODES FOR CARRYING OUT THE INVENTION (Composition (C))

A composition (C) of the present invention contains a particular amount of a modified polyvinyl alcohol (A) having double bonds derived from an unsaturated carboxylic acid or a derivative thereof in side chains (hereinafter, sometimes abbreviated as "modified PVA (A)"), and a particular amount of a compound (B). A preferable method for producing a composition (C) of the present invention is, but not limited to, a method comprising reacting a polyvinyl alcohol (D) and an unsaturated carboxylic acid or a derivative thereof in the presence of a compound (B). Herein, a polyvinyl alcohol (D) is a PVA free of double bonds in side chains (hereinafter, sometimes referred to as "PVA(D)" or "starting PVA").

(Modified PVA (A))

The above starting PVA(PVA(D)) can be produced by polymerizing a vinyl ester monomer in accordance with a conventionally known method such as bulk polymerization, solution polymerization, suspension polymerization, emulsion polymerization and dispersion polymerization. From the industrial point of view, preferred are solution polymerization, emulsion polymerization and dispersion polymerization. Polymerization can be carried out by any style of batch polymerization, semi-batch polymerization and continuous polymerization.

Examples of a vinyl ester monomer which can be used for polymerization include vinyl acetate, vinyl formate, vinyl propionate, vinyl caprylate and vinyl versate. Among these, vinyl acetate is preferable from the industrial point of view.

In polymerization of a vinyl ester monomer, a vinyl ester monomer can be copolymerized with another monomer without departing from the scope of the present invention. Examples of other monomers which can be used include α-olefins such as ethylene, propylene, n-butene and isobutylene; acrylic acid and its salts; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and its salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetone acrylamide, acrylamide propanesulfonic acid and its salts, acrylamide propyldimethylamine and its salts or quaternary salts, and N-methylolacrylamide and its derivatives; methacrylamide derivatives such as methacrylamide, N-methylmethacrylamide, N-ethylmethacrylamide, methacrylamide propanesulfonic acid and its salts, methacrylamide propyldimethylamine and its salts or quaternary salts, N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid and fumaric acid, and their salts or esters; vinylsilyl compounds such as vinyltrimethoxysilane; and isopropenyl acetate. The amount of the other monomer involved in copolymerization is generally 10 mol % or less.

In polymerization of a vinyl ester monomer, a chain transfer agent can coexist for adjusting a polymerization degree of the resulting polyvinyl ester. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol and dodecyl mercaptan; halogenated hydrocarbons such as trichloroethylene and perchloroethylene, and, inter alia, aldehydes and ketones can be suitably used. The amount of the chain transfer agent depends on a chain transfer constant of the chain transfer agent added and a polymerization degree of a targeted polyvinyl ester, and generally it is desirably 0.1 to 10% by mass based on the polyvinyl ester.

For saponification of a polyvinyl ester, well-known alcoholysis or hydrolysis using a basic catalyst such as sodium hydroxide, potassium hydroxide and sodium methoxide or an acidic catalyst such as p-toluenesulfonic acid can be employed. Examples of a solvent which can be used in such a saponification reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Particularly, it is convenient and preferable that the saponification is effected using methanol or a mixed solution of methanol and methyl acetate as a solvent in the presence of sodium hydroxide as a basic catalyst.

Examples of an unsaturated carboxylic acid or a derivative thereof which can be used in the present invention include unsaturated monocarboxylic acids such as acrylic acid, methacrylic acid, crotonic acid, isocrotonic acid, propynoic acid, 2-pentenoic acid, 4-pentenoic acid, 2-heptenoic acid, 2-octenoic acid, cinnamic acid, myristoleic acid, palmitoleic acid, oleic acid, elaidic acid, vaccenic acid, gadoleic acid, erucic acid, nervonic acid, linoleic acid, linolenic acid, eleostearic acid, stearidonic acid, arachidonic acid, eicosapentaenoic acid, clupanodonic acid, docosahexaenoic acid and sorbic acid; unsaturated dicarboxylic acids such as maleic acid, fumaric acid, itaconic acid, citraconic acid, mesaconic acid, muconic acid, phenylmaleic acid and chloromaleic acid; unsaturated tricarboxylic acids such as aconitic acid; unsaturated carboxylic anhydrides such as maleic anhydride, itaconic anhydride and citraconic anhydride; unsaturated carboxylic acid alkyl esters such as acrylic acid alkyl esters, methacrylic acid alkyl esters and crotonic acid alkyl esters; unsaturated dicarboxylic acid monoesters such as maleic acid monoalkyl esters including maleic acid monomethyl ester (monomethyl maleate), fumaric acid monoalkyl esters and itaconic acid monoalkyl esters; and unsaturated dicarboxylic acid diesters such as maleic acid dialkyl esters, fumaric acid dialkyl esters and itaconic acid dialkyl esters. These carboxylic acids can be used as a salt. A carboxylic acid or a salt thereof can be used alone or in combination of two or more.

Among these, an unsaturated carboxylic acid or a derivative thereof used in the present invention is preferably an unsaturated dicarboxylic acid, an unsaturated carboxylic acid anhydride or an unsaturated dicarboxylic acid monoester in the light of reactivity with a hydroxy group of a starting PVA. In the light of a higher boiling point and good handleability, an unsaturated carboxylic acid or a derivative thereof is more preferably maleic anhydride, citraconic acid, itaconic acid, fumaric acid, aconitic acid, phenylmaleic acid, chloromaleic acid, muconic acid or maleic acid monoalkyl ester; in the light of reactivity, further preferably maleic anhydride, itaconic acid, citraconic acid, fumaric acid or a maleic acid monoalkyl ester; particularly preferably citraconic acid, fumaric acid or itaconic acid; most preferably itaconic acid.

It is important that the modified PVA (A) contains 0.01 mol % or more and less than 2 mol % of double bonds derived from an unsaturated carboxylic acid or a derivative thereof in side chains. Here, "the modified PVA (A) contains 0.01 mol % or more and less than 2 mol % of double bonds derived from an unsaturated carboxylic acid or a derivative thereof in side chains" means that the modified PVA (A) contains double bonds derived from an unsaturated carboxylic acid or a derivative thereof in side chains, and the amount of the double bonds is 0.01 mol % or more and less than 2 mol % based on the total monomer units.

When suspension polymerization of a vinyl compound is carried out using a dispersion stabilizer for suspension polymerization containing a modified PVA (A) having less than 0.01 mol % of the above double bonds, polymerization stability is lowered, leading to a polymer containing many coarse particles and having many fisheyes. The amount of the above double bond is preferably 0.03 mol % or more. If a coating agent contains a modified PVA (A) having less than 0.01 mol % of the above double bonds, curing of a silicone in a release layer is insufficiently accelerated, and/or adhesiveness between a substrate and the release layer is insufficient. The amount of the above double bonds is preferably 0.03 mol % or more.

Meanwhile, a modified PVA (A) having 2 mol % or more of the above double bonds cannot be easily produced, and is, if possible, produced with a low productivity. A composition (C) containing such a modified PVA (A) has poor hue, and when being dissolved in water, generates insolubles. When a dispersion stabilizer for suspension polymerization containing the modified PVA (A) having 2 mol % or more of the above double bonds is used for suspension polymerization of a vinyl compound, a resulting polymer has poor hue and many fisheyes. From this point of view, the amount of the above double bonds is preferably less than 1.7 mol %. Furthermore, a coating agent containing the modified PVA (A) having 2 mol % or more of the above double bonds may, during a long-term storage, gelate due to reaction of the double bonds. From this point of view, the amount of the above double bonds is preferably less than 1.5 mol %, more preferably less than 1.0 mol %. Herein, the above double bond means a carbon-carbon double bond.

The amount of double bonds derived from an unsaturated carboxylic acid or a derivative thereof in a modified PVA (A) can be measured by a known method. Specifically, measurement by $^1$H-NMR is convenient. When the amount of double bonds derived from an unsaturated carboxylic acid or a derivative thereof in a modified PVA (A) is measured, it is preferable that purification is conducted by removing the unreacted unsaturated carboxylic acid or a derivative thereof before measurement. A purification method is, but not limited to, for example, a method of washing with a solution which cannot dissolve the modified PVA(A) but can dissolve an unreacted unsaturated carboxylic acid or a derivative thereof can be used. For the purification, a reprecipitation method is convenient and preferable, wherein the modified PVA (A) is first dissolved in water to give an aqueous solution with about 1 to 20% by mass, and then the aqueous solution is added dropwise to a solution which cannot dissolve the modified PVA (A) but can dissolve the unreacted unsaturated carboxylic acid or a derivative thereof, to precipitate the modified PVA (A).

A viscosity-average polymerization degree of the modified PVA (A) is preferably 400 or more, more preferably 500 or more. When the composition (C) is used for a coating agent, a viscosity-average polymerization degree of the modified PVA (A) is preferably 1000 or more in the light of silicone sealability. Meanwhile, a viscosity-average polymerization degree of the modified PVA (A) is preferably less than 5000, more preferably less than 3000. When the composition (C) is used for a dispersion stabilizer for suspension polymerization, it is further preferably less than 1500, particularly preferably less than 1000 in the light of polymerization stability and reducing coarse particles of a polymer obtained. A viscosity-average polymerization degree is determined in accordance with JIS-K6726 (1994). Specifically, when a saponification degree is less than 99.5 mol %, it is saponified to give a PVA with a saponification degree of 99.5 mol % or more, for which a viscosity-average polymerization degree(P) is determined in accordance with the following equation, using a limiting viscosity [η] (liter/g) measured at 30° C. in water.

$$P=([\eta]\times 10^4/8.29)^{(1/0.62)}$$

A saponification degree of the modified PVA (A) is preferably 65 mol % or more in the light of water solubility. If a saponification degree is less than 65 mol %, water solubility of the modified PVA (A) is reduced particularly in the application of a coating agent, which may lead to a coating agent having a clouding point, an uneven film surface coated with the coating agent, and deterioration in silicone sealability. A saponification degree of the modified PVA (A) is more preferably 70 mol % or more, further preferably 75 mol % or more, particularly preferably 80 mol % or more. Meanwhile, a saponification degree of the modified PVA (A) is preferably 99.99 mol % or less. To produce a modified PVA (A) with a saponification degree of more than 99.99 mol % is difficult. A saponification degree of the modified PVA (A) is preferably less than 97 mol %, more preferably less than 90 mol %, further preferably less than 85 mol %, particularly preferably less than 77 mol %. A saponification degree is determined in accordance with JIS-K6726 (1994).

The amount of 1,2-glycol bond in the modified PVA (A) is preferably less than 1.9 mol %, more preferably 1.8 mol % or less, further preferably 1.7 mol % or less. If the amount of 1,2-glycol bond is 1.9 mol % or more, production must be carried out at an elevated temperature, so that controlling of the reaction is difficult and productivity tends to be reduced. Furthermore, when it is used as a dispersion stabilizer for suspension polymerization of a vinyl compound, polymerization stability tends to be deteriorated and fisheyes in a polymer obtained tend to increase. The amount of 1,2-glycol bond in the modified PVA (A) is generally 1.0 mol % or more.

The amount of 1,2-glycol bond is determined from $^1$H-NMR peaks. Specifically, a modified PVA (A) is saponified to a saponification degree of 99.9 mol % or more, then sufficiently washed with methanol, and then dried under reduced pressure at 90° C. for 2 days. Subsequently, the PVA is dissolved in DMSO-$d_6$ and a few drops of trifluoroacetic acid are added to give a sample, which is then analyzed by $^1$H-NMR at 500 MHz at 80° C. A peak originating from a methine in a vinyl alcohol unit belongs to 3.2 to 4.0 ppm (integrated value α) and a peak originating from one methine in 1,2-glycol bond belongs to near 3.15 to 3.35 ppm (integrated value β) and the amount of 1,2-glycol bond is calculated by the following equation.

Amount of 1,2-glycol bond (mol %)=β/α×100

(Compound (B))

A compound (B) in the present invention is a compound having a conjugated double bond and two or more hydroxy groups bonded to the conjugated double bond, or a salt or oxide thereof. Herein, a hydroxy group bonded to a conjugated double bond denotes a hydroxy group bonded to a carbon constituting a conjugated carbon-carbon double bond.

An example of a compound having conjugated double bonds is a conjugated polyene having a structure of alternately connected carbon-carbon double bonds and carbon-carbon single bonds. Examples of a conjugated polyene include a conjugated diene having a structure of alternately connected two carbon-carbon double bonds and one carbon-carbon single bond, and a conjugated triene having alternately connected three carbon-carbon double bonds and two carbon-carbon single bonds.

The above conjugated polyene include a conjugated polyene having a plurality of conjugated double bonds consisting of a plurality of carbon-carbon double bonds in one molecule which are not mutually conjugated. The conjugated polyene can be linear or cyclic.

Furthermore, a compound having conjugated double bonds include, in addition to the above conjugated polyenes, aromatic hydrocarbons such as benzene, and $\alpha,\beta$-unsaturated carbonyl compounds having a carbon-carbon double bond conjugated with an intramolecular carbonyl group.

In compound (B), hydroxy groups can be bonded at any position as long as they are bonded to a carbon constituting a conjugated carbon-carbon double bond, and the total number of hydroxy groups must be two or more. When the compound having conjugated double bonds is a conjugated polyene, it can be a compound having hydroxy groups bonded to an unsaturated carbon. When the compound having conjugated double bonds is an aromatic hydrocarbon, it can be a compound having hydroxy groups bonded to a carbon constituting the aromatic ring. When the compound having conjugated double bonds is an $\alpha,\beta$-unsaturated carbonyl compound, it can be a compound having hydroxy groups bonded at $\alpha$- and $\beta$-positions.

Among these, a compound (B) is preferably a compound having two or more hydroxy groups bonded to a carbon constituting an aromatic ring or a salt or oxide thereof in the light of good hue and excellent water solubility of a composition (C) obtained and further reducing water-insoluble composition (C), and also preferably, a compound having two or more hydroxy groups bonded to an $\alpha,\beta$-unsaturated carbonyl compound at $\alpha$- and $\beta$-positions, or a salt or oxide thereof. In particular, a compound having two or more hydroxy groups bonded to a carbon constituting an aromatic ring or a salt or oxide thereof is more preferable in the light of further improving hue of a composition (C) obtained and further reducing water-insoluble composition (C) with the use of a small amount.

In the light of further preventing coloring and fisheyes in a vinyl polymer produced using a composition (C), preferred are a compound having two or more hydroxy groups bonded to a carbon constituting an aromatic ring or a salt or oxide thereof is preferable, and also a compound having two or more hydroxy groups bonded to an $\alpha,\beta$-unsaturated carbonyl compound at $\alpha$- and $\beta$-positions, or a salt or oxide thereof.

A compound having two or more hydroxy groups bonded to a carbon constituting an aromatic ring can be a polyphenol. Examples of the polyphenol include hydroxybenzenes such as pyrogallol, phloroglucinol, hydroxyquinol and hexahydroxybenzene; phenolic carboxylic acids such as gallic acid; phenolic carboxylic acid esters such as gallic acid alkyl esters; and catechins such as epicatechin, epigallocatechin and epigallocatechin 3-gallate. Examples of a gallic acid alkyl ester include methyl gallate, ethyl gallate, propyl gallate, octyl gallate and dodecyl gallate.

Among these, a compound (B) is preferably a phenolic carboxylic acid or phenolic carboxylic acid ester, more preferably gallic acid or a gallic acid alkyl ester, further preferably a gallic acid alkyl ester.

An example of a compound having hydroxy groups bonded to an $\alpha,\beta$-unsaturated carbonyl compound at $\alpha$- and $\beta$-positions is ascorbic acid. A compound (B) is also preferably ascorbic acid.

A compound (B) used in the present invention can be a salt of the above compound. A salt herein denotes a metal alkoxide in which a hydrogen atom of a hydroxy group bonded to a conjugated double bond is replaced with a metal atom, or a carboxylate salt in which a hydrogen atom of an intramolecular carboxyl group is replaced with a metal atom. Example of the metal include sodium and potassium. Examples of a salt of a compound having two or more hydroxy groups bonded to a conjugated double bond include gallic acid salts such as sodium gallate; and ascorbic acid salts such as sodium ascorbate.

A compound (B) used in the present invention can be an oxide of the above compound. An oxide herein denotes a compound in which a hydroxy group bonded to a conjugated double bond is oxidized. Examples of such a compound include benzoquinone and dehydroascorbic acid.

In the light of performance of a composition (C) as a dispersion stabilizer for suspension polymerization and further improvement of hue of a coating agent, a compound (B) is herein preferably a compound having a conjugated double bond and two or more hydroxy groups bonded to the conjugated double bond, more preferably a compound having two or more hydroxy groups bonded to a conjugated double bond.

(Production Method for Composition (C))

A composition (C) in the present invention contains a modified PVA (A) and a compound (B). A suitable production method for a composition (C) is, but not limited to, a method comprising reacting a PVA (D) (starting PVA) and an unsaturated carboxylic acid or a derivative thereof in the presence of a compound (B). Here, preferably, the reaction is carried out under heating for accelerating the reaction. A heating temperature is preferably 80 to 180° C. A heating time can be appropriately selected in relation to a heating temperature, and is generally 10 minutes to 24 hours.

A starting PVA is reacted with an unsaturated carboxylic acid or a derivative thereof in the presence of a compound (B), preferably by a method comprising preparing a solution by dissolving the unsaturated carboxylic acid or a derivative thereof and the compound (B) in a liquid, adding powder of the starting PVA to the solution to make the powder swollen, removing the solution to provide a mixed powder and heating the mixed powder. The reaction in a solid in the presence of the compound (B) as described above can prevent an undesirable crosslinking reaction from proceeding and provide a composition (C) having good water solubility. By this reaction method, a powder consisting of the composition (C) can be provided. Examples of a liquid which can dissolve the compound (B) include alcohols such as methanol, ethanol and propanol; and water. The liquid can be removed by heating or reducing pressure, preferably by reducing pressure.

In the above reaction method, a content of the unsaturated carboxylic acid or a derivative thereof in the mixed powder before heating is preferably 0.01 parts by mass or more, more preferably 0.1 parts by mass or more, further preferably 0.5 parts by mass or more based on 100 parts by mass of the starting PVA. Meanwhile, a content of the unsaturated carboxylic acid or a derivative thereof in the mixed powder before heating is preferably 15 parts by mass or less, more preferably 10 parts by mass or less, further preferably 7 parts by mass or less, particularly preferably 5 parts by mass or less, most preferably 3.5 parts by mass or less based on 100 parts by mass of the starting PVA. For the composition (C), the starting PVA contained in the mixed powder before heating is converted to a modified PVA (A) while the compound (B) remains as it is.

It is essential in the present invention that a content of the compound (B) in the composition (C) is 0.001 parts by mass or more and less than 5 parts by mass based on 100 parts by mass of the modified PVA (A). If a content of the compound (B) in the composition (C) is less than 0.001 parts by mass based on 100 parts by mass of the modified PVA (A), hue of the composition (C) obtained is deteriorated. Furthermore, when the composition (C) is dissolved in water, insolubles are generated. If such a composition (C) is used as a dispersion stabilizer for suspension polymerization of a vinyl compound, a polymer obtained has poor hue and many fisheyes. If a coating agent prepared by dissolving such a composition (C) in water is applied to a substrate such as a paper, hue of the substrate is deteriorated. From these perspectives, a content of the compound (B) in the composition (C) is preferably 0.005 parts by mass or more, more preferably 0.01 parts by mass or more, further preferably 0.05 parts by mass or more based on 100 parts by mass of the modified PVA (A).

If a content of the compound (B) in the composition (C) is 5 parts by mass or more based on 100 parts by mass of the modified PVA (A), when the composition (C) is used as a dispersion stabilizer for suspension polymerization of a vinyl compound, vinyl polymer particles obtained have a larger average particle size and many coarse particles are formed. Furthermore, fisheyes in a vinyl polymer obtained are increased. Furthermore, if a release paper is produced using a coating agent containing such a composition (C), during long-term storage of the release paper, the compound (B) may bleed out to an interface between the PVA layer and the silicone layer, leading to deterioration of adhesiveness. From these perspectives, a content of the compound (B) in the composition (C) is preferably 3 parts by mass or less, more preferably 2 parts by mass or less, further preferably 1 part by mass or less.

A shape of the composition (C) is preferably, but not limited to, a powder in the light of a dissolution rate in water. Here, a particle size of the powder is generally 50 to 2000 µm. A particle size of powder is an average particle size determined in accordance with JIS-K6726 (1994).

A yellow index (hereinafter, sometimes abbreviated as "YI") of a powder consisting of the composition (C) is preferably less than 50. If a YI is 50 or more, when the composition (C) is used as a dispersion stabilizer for suspension polymerization of a vinyl compound, hue of a vinyl polymer obtained may be deteriorated. Furthermore, if a coating agent containing a composition (C) with a YI of 50 or more is applied to a substrate such as a paper, hue of the substrate may be deteriorated. A YI is more preferably 40 or less, further preferably 30 or less, particularly preferably 20 or less, most preferably 15 or less. Herein, a YI is a measured and calculated value in accordance with JIS-Z8722 (2009) and JIS-K7373 (2006).

[Utilities]

A composition (C) of the present invention can be used for various applications. The followings are, but not limited to, examples thereof.

(1) Dispersant: a dispersion stabilizer of an organic or inorganic pigment for a paint, an adhesive, etc.; a dispersion stabilizer for suspension polymerization and a dispersion aid for various vinyl compounds such as vinyl chloride, vinylidene chloride, styrene, (meth)acrylate and vinyl acetate, (2) Adhesive: an adhesive, a sticking agent, a remoistening adhesive, various binders, and additive for a cement and a mortar, (3) Covering agent: a coating agent for a paper, a sizing, a fiber finishing agent, a leather finishing agent, a paint, an anti-fogging agent, a metal corrosion inhibitor, a brightening agent for zinc plating, an antistatic agent, and a covering agent for medicine, (4) Emulsifier: an emulsifier for emulsion polymerization and a post-emulsifier such as Bitumen, (5) Flocculant: a flocculant for aquatic suspended matter and dissolved matter and a metal flocculant, (6) Molded article: a fiber, a sheet, a pipe, a tube, a leakage prevention film, a watersoluble fiber for a chemical lace and a sponge, (7) Film: a water-soluble film, a polarizing film, and a barrier film, (8) Gel: a gel for medicine and an industrial gel, (9) Post-reaction: post-reaction with a low-molecular organic compound, a macromolecular organic compound or an inorganic compound.

(Dispersion Stabilizer for Suspension Polymerization of a Vinyl Compound)

Among these, a suitable application of the composition (C) of the present invention is a dispersion stabilizer for suspension polymerization of a vinyl compound which contains the composition (C). The composition (C) of the present invention has good hue and when it is dissolved in water, generates less insolubles and thus has excellent water solubility. Therefore, when such a composition (C) is used as a dispersion stabilizer in suspension polymerization of a vinyl compound, the polymerization reaction is stabilized and formation of coarse particles is reduced. Furthermore, coloring and fisheyes in a vinyl polymer obtained can be inhibited.

The above dispersion stabilizer for suspension polymerization can contain various additives other than the modified PVA (A) and the compound (B), without departing from the scope of the present invention. Examples of such additives include a polymerization regulator such as aldehydes, halogenated hydrocarbons and mercaptans; a polymerization inhibitor such as phenol compounds, sulfur-containing compounds and N-oxides; a pH regulator; a cross-linker; a preservative; a mildew-proofing agent; a blocking inhibitor; a defoamer; and a compatibilizing agent. A content of the various additives in the dispersion stabilizer for suspension polymerization is preferably 10% by mass or less, more preferably 5% by mass or less based on the total amount of the modified PVA (A) and the compound (B).

(Method for Producing Vinyl Polymer)

A preferable embodiment of the present invention is a method for producing by suspension-polymerizing a vinyl compound in the presence of the composition (C) of the present invention and a polyvinyl alcohol (E) (hereinafter, sometimes abbreviated as "PVA (E)") having a saponification degree and a viscosity-average polymerization degree different from those of the modified PVA (A). Herein, the modified PVA (A) contained in the composition (C) and the PVA (E) are different in both saponification degree and viscosity-average polymerization degree. The PVA (E) can be unmodified or modified.

Here, preferably, one of the modified PVA (A) and the PVA (E) having a saponification degree and a viscosity-average polymerization degree different from those of the modified PVA (A) is a PVA with a saponification degree of 77 mol % or more and less than 97 mol % and a viscosity-average polymerization degree of 1500 or more and less than 5000, and the other is a PVA with a saponification degree of 65 mol % or more and less than 77 mol % and a viscosity-average polymerization degree of 400 or more and less than 1500. A saponification degree of a PVA is determined in accordance with JIS-K6726 (1994). A viscosity-average polymerization degree of a PVA is determined in accordance with JIS-K6726 (1994) as is described for the modified PVA (A).

Preferably, for the modified PVA (A), a saponification degree is 65 mol % or more and less than 77 mol %, and a viscosity-average polymerization degree is 400 or more and less than 1500; and for the PVA (E), a saponification degree of is 77 mol % or more and less than 97 mol %, and a viscosity-average polymerization degree is 1500 or more and less than 5000. In this manner, polymerization of a vinyl compound is more stabilized and coloring and fisheyes in a vinyl polymer obtained can be more effectively prevented.

A mass ratio (C/E) of the composition (C) to the PVA (E) is preferably 50/50 to 90/10. With a mass ratio (C/E) of the composition (C) to PVA (E) within the above range, polymerization of the vinyl compound is more stabilized and a particle size of vinyl polymer particles obtained becomes more uniform.

A method for charging a dispersion stabilizer for suspension polymerization of the present invention containing a composition (C) and a PVA (E) into a polymerization tank can include, but not limited to, (i) a method in which the PVA (E) and the dispersion stabilizer for suspension polymerization of the present invention as powder are blended and then dissolved in water, and the aqueous solution is charged into a polymerization tank, (ii) a method in which the dispersion stabilizer for suspension polymerization of the present invention and the PVA (E) are separately dissolved in water to prepare aqueous solutions, which are then combined and the resulting aqueous solution is charged into a polymerization tank, (iii) a method in which the dispersion stabilizer for suspension polymerization of the present invention and the PVA (E) are separately dissolved in water to prepare aqueous solutions, which are not combined, but are separately charged into a polymerization tank, and (iv) a method in which the dispersion stabilizer for suspension polymerization of the present invention and the PVA (E) are charged as powder. In the light of homogeneity in a polymerization tank, any of the above methods (i), (ii) and (iii) is preferable.

Examples of a vinyl compound used in a method for producing a vinyl polymer of the present invention include halogenated vinyls such as vinyl chloride; vinyl esters such as vinyl acetate and vinyl propionate; acrylic acid, methacrylic acid, and esters and salts thereof; maleic acid, fumaric acid, and esters and anhydrides thereof; styrene; acrylonitrile; vinylidene chloride; and vinyl ethers. Among these, a dispersion stabilizer for suspension polymerization of the present invention is particularly preferably used in suspension polymerization of vinyl chloride alone or vinyl chloride in combination with a monomer copolymerizable with vinyl chloride. Examples of a monomer copolymerizable with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; and vinyl ether.

In suspension polymerization of a vinyl compound, an oil-soluble or water-soluble polymerization initiator which has been conventionally used in polymerization of vinyl chloride can be used. Examples of an oil-soluble polymerization initiator include percarbonates compounds such as diisopropyl peroxydicarbonate, di-2-ethylhexyl peroxydicarbonate and diethoxyethyl peroxydicarbonate; perester compounds such as t-butyl peroxyneodecanoate, t-butyl peroxypivalate, t-hexyl peroxypivalate and α-cumyl peroxyneodecanoate; peroxides such as acetylcyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-2,4-dimethylvaleronitrile). Examples of a water-soluble polymerization initiator include potassium persulfate, ammonium persulfate, hydrogen peroxide and cumene hydroperoxide. These oil-soluble or water-soluble polymerization initiators can be used alone or in combination of two or more.

In suspension polymerization of a vinyl compound, there are no particular restrictions to a polymerization temperature, and it can be adjusted to a lower temperature such as about 20° C., or a high temperature over 90° C. Furthermore, a polymerization vessel equipped with a reflux condenser can be used in order to increase a cooling efficiency of a polymerization reaction system.

In suspension polymerization of a vinyl compound, in addition to the composition (C) and the PVA (E), other additives can be combined, including a water-soluble cellulose ether such as methylcellulose, hydroxyethylcellulose, hydroxypropylcellulose and hydroxypropylmethylcellulose; a water-soluble polymer such as gelatin; an oil-soluble emulsifier such as sorbitan monolaurate, sorbitan trioleate, glycerin tristearate and ethylene oxide-propylene oxide block copolymer; and/or a water-soluble emulsifier such as polyoxyethylene sorbitan monolaurate, polyoxyethylene glycerin oleate and sodium laurate, and the like, which are commonly used for suspension polymerization of a vinyl compound in an aqueous medium. The amount of these is preferably, but not limited to, 0.01 parts by mass or more and 1.0 parts by mass or less based on 100 parts by mass of the vinyl compound.

A vinyl polymer obtained by the production method of the present invention which appropriately contains, for example, a plasticizer, can be used for various molded articles.

(Coating Agent)

A suitable application of the composition (C) of the present invention is a coating agent consisting of an aqueous solution containing the composition (C). The coating agent containing the composition (C) of the present invention can highly improve silicone sealability and water resistance of a base paper for release paper and can accelerate curing a silicone in a release layer and improve adhesiveness between a substrate and a release layer. A suitable method for producing the coating agent of the present invention can be, but not limited to, a method comprising reacting the PVA (D) with an unsaturated carboxylic acid or a derivative thereof in the presence of the compound (B) to provide the composition (C) comprising the modified PVA (A) and the compound (B); and then dissolving the composition (C) in water.

The coating agent of the present invention consists of an aqueous solution containing the modified PVA (A) and the compound (B). The coating agent of the present invention preferably contains 200 parts by mass or more and 100,000 parts by mass or less of water as a solvent. If the amount of water is less than 200 parts by mass, high-speed coatability may be deteriorated. The amount of water is more preferably 400 parts by mass or more, further preferably 600 parts by mass or more. Meanwhile, if the amount of water is more than 100,000 parts by mass, coating efficiency may be down. The amount of water is more preferably 50,000 parts by mass or less, further preferably 10,000 parts by mass or less.

The coating agent of the present invention can contain, in addition to the modified PVA (A), the compound (B) and water, other components without impairing the effects of the present invention. Examples of the other components include aqueous dispersible resins such as SBR latex, NBR latex, a vinyl acetate emulsion, an ethylene/vinyl acetate copolymer emulsion, a (meth)acrylate emulsion and a vinyl chloride emulsion; raw starches such as those from wheat, corn, rice, potato, ocarina, tapioca and sago palm; decomposition products of a raw starch such as oxidized starch and dextrin; starch derivatives such as etherified starch, esterified starch and cation ized starch; cellulose derivatives such as methylcellulose, hydroxyethylcellulose and carboxymethylcellulose (CMC); monosaccharides such as glucose, fructose, isomerized sugar and xylose; disaccharides such as maltose, lactose, sucrose, trehalose, palatinose, reduced maltose, reduced palatinose and reduced lactose; oligosaccharides such as starch syrup, isomalto-oligosaccharide, fructo-oligossaccharide, lacto-oligosaccharide, soybean oligosaccharide, xylo-oligosaccharide, coupling sugar and cyclodextrine compounds; polysaccharides such as pullulan, pectine, agar, konjac mannan, polydextrose and xanthane gum; albumin; gelatin; casein; gum arabic; polyamide resins; melamine resins; poly(meth)acrylamide; polyvinylpyrrolidone; sodium poly(meth)acrylate; anion-modified PVA; sodium alginate; and water-soluble polyesters.

Another components can be a pigment. Examples of a pigment include inorganic pigments (for example, clay, kaolin, aluminum hydroxide, calcium carbonate and talc) and organic pigments (for example, plastic pigments) commonly used for producing a coated paper.

Examples of other components include a viscosity modifier, an adhesion improver, an antifoam, a plasticizer, a water resistance additive, a preservative, an antioxidant, a penetrating agent, a surfactant, a filler, starch and a derivative thereof and latex.

A content of these other components in the above coating agent is generally 50 parts by mass or less based on 100 parts by mass of the modified PVA (A).

(Method for Producing a Coating Agent)

The coating agent of the present invention contains the modified PVA (A), the compound (B) and water. A suitable method for producing a coating agent is, but not limited to, a method comprising the first step for reacting the PVA (D) (starting PVA) with the unsaturated carboxylic acid or a derivative thereof in the presence of the compound (B) to provide the composition (C) containing the modified PVA (A) and the compound (B); and the second step for dissolving the composition (C) obtained in the first step in water to produce the coating agent. The first step of producing the composition (C) is not described because it is as described for the above method for producing a composition (C).

In the second step, the composition (C) obtained in the first step is dissolved in water to prepare a coating agent. The amount of water is as described above. Furthermore, water (a solvent) dissolving the composition (C) can contain an organic solvent including an alcohol such as methanol; and acetone, and inorganic particles insoluble in water such as clay. A content of the components other than water in the solvent is preferably 50% by mass or less, more preferably 20% by mass or less.

A substrate coated with a coating agent of the present invention is, but not limited to, a paper, a film or the like. Among these, a substrate coated with a coating agent of the present invention is preferably a paper.

A preferable embodiment of the present invention is the use of the coating agent as a coating agent for paper. Examples of a paper which can be used include known papers or synthetic papers produced by papermaking using a chemical pulp such as hardwood kraft pulps and softwood kraft pulps or a mechanical pulp such as GP (groundwood pulp), RGP (refiner ground pulp) and TMP (thermomechanical pulp). Furthermore, the above paper can be a high-quality paper, a wood-containing paper, an alkaline paper, a glassine paper, a semiglassine paper, or a paper board or white paperboard for a cardboard, a building material, a white chipboard or a chip board. Here, a paper can contain an organic or inorganic pigment, and a papermaking aid such as a paper strengthening agent, a size agent and a yield improver. Furthermore, a paper can undergo various surface treatment.

A preferable embodiment of the present invention is a base paper for release paper produced by coating a paper with the above coating agent. In forming a release layer on the base paper for release paper, the above coating agent plays a role of a sealer. That is, a base paper for release paper produced by coating a paper with the above coating agent has a sealing layer on a substrate. A preferable method for producing a base paper for release paper is, but not limited to, a method comprising coating the substrate with a coating agent and drying the coated substrate. A paper can be selected from those described above.

Coating of a coating solution can be carried out using a common coated-paper facility; for example, a substrate can be coated with a coating solution in one layer or multiple layers by an on-machine or off-machine coater equipped with a coating apparatus such as a blade coater, an air knife coater, a transfer roll coater, a rod metalling size press coater, a curtain coater and a wire bar coater. A drying method after coating can be appropriately selected from various drying methods such as hot-air heating, gas-heater heating and infrared-heater heating. The coating amount is preferably 0.3 to 5.0 g/m$^2$ in dry mass. If the coating amount is less than 0.3 g/m$^2$, sealing effects of a silicone may be reduced. The coating amount is more preferably 0.5 g/m$^2$ or more. Meanwhile, if the coating amount is more than 5.0 g/m$^2$, a sealing layer forms so much flat planes on the substrate that a surface area is reduced, and thus, after forming a silicone layer, adhesiveness between the substrate and the silicone layer may be insufficient. The coating amount is more preferably 3.0 g/m$^2$ or less.

In the present invention, an air permeability measured using an Oken type smoothness and air permeability tester in accordance with JIS-P8117 (2009) can be used as a measure for determining sealing effect of a sealing layer. An air permeability is preferably 2000 sec or more, more preferably 5000 sec or more, further preferably 10000 sec or more, particularly preferably 30000 sec or more. If an air permeability is less than 2000 sec, sealing effect may be reduced. Here, a lower air permeability (the number of seconds; sec) means a larger air-permeation speed.

In the present invention, a water absorbency determined by Cobb method in accordance with JIS-P8140 (1998) can be used as a measure for determining water resistance of a sealing layer. A water absorbency (60 sec) is preferably 70 g/m$^2$ or less, more preferably 50 g/m$^2$ or less, further preferably 45 g/m$^2$ or less.

The substrate is coated with a coating solution, dried and smoothed in order to improve sealing effect without impairing the effect. Preferable examples of a smoothing method include supercalender, gloss calender, multinip calender, soft calender and belt nip calender.

A release paper having the base paper for release paper and a release layer formed on the surface of the base paper for release paper is also a preferable embodiment of the present invention. Here, it is preferable that the release layer contains an addition-type silicone (F) and platinum (G), and platinum (G) is contained in 0.001 parts by mass or more and 0.05 parts by mass or less based on 100 parts by mass of the addition-type silicone (F). With a content of platinum (G) within the range, a release paper with excellent curability can be obtained. If a content of platinum (G) is less than 0.001 parts by mass, the addition-type silicone (F) insufficiently cures, and resultantly, high-temperature treatment is required. A content of platinum (G) is preferably 0.002 parts by mass or more, more preferably 0.004 parts by mass or more. Meanwhile, if a content of platinum (G) is more than 0.05 parts by mass, a cost increases, leading to an economic problem. A content of platinum (G) is preferably 0.03 parts by mass or less, more preferably 0.02 parts by mass or less.

The addition-type silicone (F) used in the present invention can be produced by hydrosilylation reaction of an organopolysiloxane (f1) containing at least two carbon-carbon double bonds in one molecule which is reactive with an SiH group with an organohydrogenpolysiloxane (f2) containing at least two SiH groups in one molecule in the presence of a platinum catalyst.

An organopolysiloxane (f1) containing at least two carbon-carbon double bonds in one molecule which is reactive with an SiH group is an organopolysiloxane containing in one molecule at least two carbon-carbon double bonds such as a vinyl group, an allyl group, a propenyl group, an isopropenyl group, a butenyl group, an isobutenyl group and a hexenyl group. Examples of the organopolysiloxane include those having a main chain consisting of diorganosiloxane repeating units and a terminal of a triorganosiloxane structure and those can have a branched chain and a ring structure. Examples of an organic group bonded to silicon in the terminal or the repeating unit include a methyl group, an ethyl group and a phenyl group. A specific example is methylphenylpolysiloxane having a vinyl group in both terminals.

An organohydrogenpolysiloxane (f2) containing at least two SiH groups in one molecule is an organopolysiloxane having two or more SiH groups in terminals and/or repeating structures. Examples of the organopolysiloxane include those having a main chain consisting of diorganosiloxane repeating units and a terminal of a triorganosiloxane structure and those can have a branched chain and a ring structure. Examples of an organic group bonded to silicon in the terminal or the repeating unit include a methyl group, an ethyl group, an octyl group and a phenyl group, two or more of which are replaced by a hydrogen atom.

The addition-type silicone (F) used in the present invention can be appropriately selected from a solvent type, a non-solvent type and an emulsion type, and in the light of reduction of environment load and coatability, a non-solvent type addition-type silicone is suitably employed. Examples of a non-solvent type addition-type silicone (F) include silicones from Dow Corning Toray Co., Ltd. such as SP7015, SP7259, SP7025, SP7248S, SP7268S, SP7030, SP7265S, LTC1006L and LTC1056L; silicones from Shin-Etsu Silicone Co., Ltd. such as KNS-3051, KNS-320A, KNS-316, KNS-3002, KNS-3300 and X-62-1387; silicones from Wacker Asahikasei Silicone Co., Ltd. such as DEHESIVE920, DEHESIVE921, DEHESIVE924, DEHESIVE927 and DEHESIVE929; silicones from Arakawa Chemical Industries Ltd. such as KF-SL101, KF-SL201, KF-SL202, KF-SL301 and KF-SL302; and silicones from Momentive Performance Materials Inc. such as TPR6600 and SL6625. It is not necessary to use these silicones alone, and these can be used, if needed, in combination of two or more.

In general, platinum catalyst is used in curing a silicone, and there are no particular restrictions to the type of a platinum catalyst used in the present invention. Preferred is a catalyst involved in curing the addition-type silicone (F) by a hydrosilylation reaction. Examples include platinum catalysts from Dow Corning Toray Co., Ltd. such as SP7077R and SRX212; and platinum catalysts from Arakawa Chemical Industries Ltd. such as CATA93B. It is not necessary to use these platinum catalysts alone, and these can be used, if needed, in combination of two or more. A content of platinum (G) can be determined by quantifying platinum in a platinum catalyst using, for example, an ICP emission spectrophotometer.

A release layer in a release paper of the present invention can also contain, in addition to the addition-type silicone (F) and platinum (G), other components without inhibiting the effects of the present invention. A content of the other components is generally 30 parts by mass or less based on 100 parts by mass of the total amount of the release layer. Examples of such other components include a viscosity modifier, an adhesion improver, an antifoam, a plasticizer, a water resistance additive, a preservative, an antioxidant, a penetrating agent, a surfactant, an inorganic pigment, an organic pigment, a filler, starch and a derivative thereof, cellulose and a derivative thereof, saccharides and latex.

A method for producing a release paper of the present invention can be, but not limited to, a method comprising applying a coating agent of the present invention on a substrate, forming a sealing layer, and then coating the sealing layer with a coating solution containing a platinum catalyst prepared in such an amount that a content of platinum (G) in a release layer is to be 0.001 to 0.05 parts by mass based on 100 parts by mass of the addition-type silicone (F), to form a release layer. A coating amount of the coating solution containing a platinum catalyst for forming a release layer is preferably, but not limited to, 0.1 to 5 g/m$^2$ (solid base). If the coating amount is less than 0.1 g/m$^2$, release performance may be deteriorated. The coating amount is more preferably 0.3 g/m$^2$ or more (solid base). If the coating amount is more than 5 g/m$^2$, adhesiveness between a release layer containing the addition-type silicone (F) and platinum (G) and a sealing layer may be lowered. The coating amount is more preferably 3 g/m$^2$ or less (solid base). Coating can be carried out by various methods, preferably by a blade coater, an air knife coater, a bar coater or the like.

EXAMPLES

There will be further detailed the present invention with reference to Examples. In the following Examples and Comparative Examples, "part(s)" and "%" denote, unless otherwise stated, part(s) by mass and % by mass, respectively.

[Viscosity-Average Polymerization Degree of PVA]

A viscosity-average polymerization degree of a PVA was determined in accordance with JIS-K6726 (1994). Specifically, when a saponification degree is less than 99.5 mol %, it is saponified to give a PVA with a saponification degree of 99.5 mol % or more, for which a viscosity-average polymerization degree(P) was determined in accordance with the following equation, using a limiting viscosity [η] (liter/g) measured at 30° C. in water.

$$P=([\eta] \times 10^4/8.29)^{(1/0.62)}$$

[Saponification Degree of PVA]

A saponification degree of a PVA was determined as described in JIS-K6726 (1994). A saponification degree of a modified PVA (A) was determined for a modified PVA (A) isolated by reprecipitating a powder consisting of the composition (C) obtained.

[Amount of Double Bonds Introduced into a Modified PVA (A)]

A 10% aqueous solution of composition (C) was prepared. Five grams of this aqueous solution was added dropwise to a solution of 500 g of methyl acetate/water=95/5, to precipitate a modified PVA (A), which was then collected and dried. For the modified PVA (A) thus isolated, the amount of double bonds introduced into the modified PVA (A) was determined by $^1$H-NMR. Here, the amount of double bonds is the amount of double bonds based on the total monomer units of the modified PVA (A).

[Amount of 1,2-Glycol Bond in a PVA]

The amount of 1,2-glycol bond in a PVA was determined by the following equation based on $^1$H-NMR analysis described above.

Amount of 1,2-glycol bond (mol %)=β/α×100 wherein α represents an integrated value of a peak originating from a methine in a vinyl alcohol unit (3.2 to 4.0 ppm), and β is an integrated value of a peak originating from one methine in 1,2-glycol bond (3.15 to 3.35 ppm).

[Water-Insolubles in an Aqueous Solution of a Composition (C)]

A 10% aqueous solution of a composition (C) prepared for measuring the amount of double bonds introduced into the above modified PVA (A) was visually observed for the presence of insolubles.

[Yellow Index (YI) of a Powder Consisting of a Composition (C)]

A powder consisting of a composition (C), after removing particles with a size of less than 100 μm and more than 1000 μm using sieves (mesh size: 100 μm, 1000 μm), was measured for a yellow index (YI) of a powder consisting of a composition (C) using a color meter (Suga Test Instruments Co., Ltd., SM-T-H1). A yellow index is measured and calculated in accordance with JIS-Z8722 (2009) and JIS-K7373 (2006).

Production Example 1 (Production of Composition 1)

In 150 parts of methanol were dissolved 0.88 parts of maleic anhydride as an unsaturated carboxylic acid and 0.1 parts of propyl gallate as a compound (B), to prepare a solution. To the solution was added 100 parts of PVA-1 (viscosity-average polymerization degree: 800, saponification degree: 72 mol %, the amount of 1,2-glycol bond: 1.6 mol %) as a starting PVA for swelling, and then methanol was removed under reduced pressure. Then, the resulting mixed powder was heated at 105° C. for 4 hours, to provide, as a composition (C), powdery composition 1 containing a modified PVA (A) having double bonds derived from maleic anhydride in side chains and compound (B). For the modified PVA (A), a peak of an introduced double bond was observed near at 6.0 to 6.5 ppm, and the amount of the double bond was 0.12 mol %. The above modified PVA (A) had a viscosity-average polymerization degree of 800, a saponification degree of 72 mol %, and a 1,2-glycol bond amount of 1.6 mol %. Powdery composition 1 had a yellow index (YI) of 20.2. Composition 1 had a particle size of 530 μm as determined in accordance with JIS-K6726 (1994). Furthermore, a 10% aqueous solution of composition 1 was prepared and no insolubles were observed in the aqueous solution.

Production Examples 2 to 19 (Production of Compositions 2 to 19)

Compositions 2 to 19 were produced as described for composition 1, except that a starting PVA, the type and the amount of an unsaturated carboxylic acid or a derivative thereof, the type and the amount of a compound (B), a heating temperature and a heating time were changed. Table 1 shows the production conditions and the production results.

TABLE 1

| Composition (C) (type) | Modified PVA(A) | | | | | | Heating conditions | |
|---|---|---|---|---|---|---|---|---|
| | Starting PVA | | Unsaturated carboxylic acid or a derivative thereof | | Compound (B) | | | |
| | Type*1 | Amount (parts) | Type | Amount (parts) | Type | Amount (parts) | Temperature (° C.) | Time (h) |
| Composition 1 | PVA-1 | 100 | Maleic anhydride | 0.88 | Propyl gallate | 0.1 | 105 | 4 |
| Composition 2 | PVA-1 | 100 | Citraconic acid | 1.17 | Propyl gallate | 0.1 | 120 | 4 |
| Composition 3 | PVA-1 | 100 | Itaconic acid | 2.34 | Propyl gallate | 0.1 | 120 | 4 |
| Composition 4 | PVA-1 | 100 | Monomethyl maleate | 1.17 | Propyl gallate | 0.1 | 105 | 4 |
| Composition 5 | PVA-2 | 100 | Citraconic acid | 1.33 | Ascorbic acid | 3 | 120 | 4 |
| Composition 6 | PVA-1 | 100 | Itaconic acid | 4.68 | Propyl gallate | 0.1 | 140 | 4 |
| Composition 7 | PVA-1 | 100 | Itaconic acid | 10 | Propyl gallate | 0.3 | 140 | 4 |
| Composition 8 | PVA-3 | 100 | Itaconic acid | 2 | Propyl gallate | 0.1 | 105 | 4 |
| Composition 9 | PVA-4 | 100 | Itaconic acid | 2.95 | Propyl gallate | 0.1 | 120 | 4 |
| Composition 10 | PVA-1 | 100 | — | — | Propyl gallate | 0.1 | 120 | 4 |
| Composition 11 | PVA-1 | 100 | Itaconic acid | 2.34 | — | — | 130 | 4 |
| Composition 12 | PVA-1 | 100 | Citraconic acid | 0.3 | — | — | 120 | 4 |
| Composition 13 | PVA-1 | 100 | Itaconic acid | 2.34 | Sorbic acid | 0.3 | 120 | 4 |
| Composition 14 | PVA-1 | 100 | Itaconic acid | 0.2 | Propyl gallate | 0.1 | 120 | 4 |
| Composition 15 | PVA-1 | 100 | Itaconic acid | 18 | Propyl gallate | 0.3 | 140 | 4 |
| Composition 16 | PVA-1 | 100 | Maleic acid | 2 | — | — | 130 | 1 |

TABLE 1-continued

| | | | | | | | | |
|---|---|---|---|---|---|---|---|---|
| Composition 17 | PVA-1 | 100 | Citraconic acid | 1.17 | Propyl gallate | 7 | 120 | 4 |
| Composition 18 | PVA-5 | 100 | Itaconic acid | 2.95 | Propyl gallate | 0.1 | 105 | 4 |
| Composition 19 | PVA-1 | 100 | Itaconic acid | 2.34 | 2.6-di-t-butyl-p-cresol | 0.2 | 120 | 4 |

| | Evaluation results of composition (C) | | | | | |
|---|---|---|---|---|---|---|
| | Modified PVA(A) | | | | | |
| Composition (C) (type) | Viscosity-average polymerization degree | Saponification degree (mol %) | Amount of introduced double bond (mol %) | Amount of 1,2-glycol bond (mol %) | Powder YI | Insolubles in an aqueous solution |
| Composition 1 | 800 | 72 | 0.12 | 1.6 | 20.2 | No |
| Composition 2 | 800 | 72 | 0.15 | 1.6 | 23.5 | No |
| Composition 3 | 800 | 72 | 0.17 | 1.6 | 29.3 | No |
| Composition 4 | 800 | 72 | 0.12 | 1.6 | 20.4 | No |
| Composition 5 | 2400 | 88 | 0.18 | 1.6 | 17.4 | No |
| Composition 6 | 800 | 71 | 0.55 | 1.6 | 39.8 | No |
| Composition 7 | 800 | 70 | 1.40 | 1.6 | 46.1 | No |
| Composition 8 | 3500 | 88 | 0.03 | 1.6 | 15.1 | No |
| Composition 9 | 1700 | 98 | 0.11 | 1.6 | 19.8 | No |
| Composition 10 | 800 | 72 | — | 1.6 | 28.5 | No |
| Composition 11 | 800 | 72 | 0.13 | 1.6 | 70.5 | Yes |
| Composition 12 | 800 | 72 | 0.03 | 1.6 | 60.1 | No |
| Composition 13 | 800 | 72 | 0.08 | 1.6 | 62.9 | Yes |
| Composition 14 | 800 | 72 | 0.005 | 1.6 | 27.2 | No |
| Composition 15 | 800 | 69 | 2.04 | 1.6 | 65.3 | Yes |
| Composition 16 | 800 | 72 | 0.35 | 1.6 | 59.2 | Yes |
| Composition 17 | 800 | 72 | 0.15 | 1.6 | 23.4 | No |
| Composition 18 | 500 | 98 | 0.11 | 1.9 | 19.7 | No |
| Composition 19 | 800 | 72 | 0.10 | 1.6 | 63.5 | Yes |

*1)
PVA-1: Kuraray Co., Ltd. "L-508W" Polymerization degree: 800, Saponification degree: 72 mol %, Amount of 1,2-glycol bond: 1.6 mol %
PVA-2: Kuraray Co., Ltd. "poval44-88" Polymerization degree: 2400, Saponification degree: 88 mol %, Amount of 1,2-glycol bond: 1.6 mol %
PVA-3: Kuraray Co., Ltd. "poval95-88" Polymerization degree: 3500, Saponification degree: 88 mol %, Amount of 1,2-glycol bond: 1.6 mol %
PVA-4: Kuraray Co., Ltd. "poval28-98S" Polymerization degree: 1700, Saponification degree: 98 mol %, Amount of 1,2-glycol bond: 1.6 mol %
PVA-5: Kuraray Co., Ltd. "HP-H105" Polymerization degree: 500, Saponification degree: 98 mol %, Amount of 1,2-glycol bond: 1.9 mol %

Example 1

Composition 1 as a dispersion stabilizer for suspension polymerization was dissolved in deionized water and 100 parts thereof was charged in an autoclave. A concentration of composition 1 in the aqueous solution was 600 ppm based on the charged vinyl chloride. Then, as a PVA (E), a PVA with a viscosity-average polymerization degree of 2400 and a saponification degree of 88 mol % was dissolved in deionized water and 100 parts thereof was charged in the autoclave. A concentration of the PVA (E) was 360 ppm based on the charged vinyl chloride. Subsequently, deionized water was added in such an amount that the total amount of deionized water was to be 1200 parts.

Then, in the autoclave were charged 0.65 parts of a 70% solution of cumyl peroxyneodecanoate in toluene and 1.05 parts of a 70% solution of t-butyl peroxyneododecanoate in toluene, and then nitrogen was introduced into the autoclave to a pressure of 0.2 MPa. Next, nitrogen purge operation was repeated five times in total for fully nitrogen-substituting the atmosphere in the autoclave to remove oxygen, and then 940 parts of vinyl chloride was charged. The content in the autoclave was heated with stirring to 57° C. to initiate polymerization of vinyl chloride. A pressure of the autoclave was 0.80 MPa at the time of polymerization initiation. After 3.5 hours from the polymerization initiation, a pressure of the autoclave became 0.70 MPa and at that point, the polymerization was terminated and unreacted vinyl chloride was removed. Then, the polymerization reaction product was removed and dried at 65° C. for 16 hours, to afford vinyl chloride polymer particles. The particles produced were evaluated as described below. The evaluation results are shown in Table 2.

(Evaluation of Vinyl Chloride Polymer Particles)

The vinyl chloride polymer particles obtained were evaluated for (1) an average particle size, (2) a particle size distribution, (3) fisheyes and (4) hue (yellow index: YI) as described below. The evaluation results are shown in Table 2.

(1) Average Particle Size

A particle size distribution was measured by a dry sieve method described in JIS-Z8815 (1994), using a Tyler mesh screen. From the results, an average particle size was calculated using a Rosin-Rammler plot.

(2) Particle Size Distribution

A content of JIS standard sieve 42 mesh-on is given in mass %. The evaluation results are shown in Table 2.

A: less than 0.5%
B: 0.5% or more and less than 1%
C: 1% or more

A content of JIS standard sieve 60 mesh-on is given in mass %. The evaluation results are shown in Table 2.

A: less than 5%
B: 5% or more and less than 10%
C: 10% or more

A smaller content for both 42 mesh-on and 60 mesh-on demonstrates a smaller amount of coarse particles and sharper particle size distribution, which means excellent polymerization stability.

(3) Fisheyes 100 parts of the vinyl chloride polymer particles obtained, 50 parts of DOP (dioctyl phthalate), 5 parts of tribasic lead sulfate and 1 part of zinc stearate were roll-kneaded at 150° C. for 7 minutes, to produce a sheet with a thickness of 0.1 mm, for which the number of fisheyes per 1000 cm$^2$ was determined.

(4) Hue (YI)

100 parts of the vinyl chloride polymer particles obtained, 3 parts of TVSN-2000E (Nitto Kasei Co., Ltd.) as a tin-containing stabilizer, and 0.01 parts of ultramarine blue were roll-kneaded in a thickness of 0.4 mm at 170° C. for 10 minutes. The sheet obtained was hot-pressed at 185° C. under a pressure of 120 kg/cm$^2$ for 5 minutes, and then pressed under cooling at 20° C. under a pressure of 150 kg/cm$^2$ for 5 minutes, to produce a 42×25×5 mm thick film.

For the thick film produced, hue (YI) was determined in accordance with JIS-K7105 (1981) using a color meter (Suga Test Instruments Co., Ltd., SM-T-H1). A larger value demonstrates that the vinyl chloride polymer was decomposed by heating, leading to yellow coloring.

Examples 2 to 12

Vinyl chlorides were suspension-polymerized as described for Example 1, except that the types and the amounts of a composition (C) used as a dispersion stabilizer for suspension polymerization, and the types and the amounts of a PVA (E) were changed. The conditions and the results are shown in Table 2.

Comparative Example 1

A vinyl chloride was suspension-polymerized as described for Example 1, except that composition 10 was used as a composition (C). The results are shown in Table 2. Since double bonds derived from an unsaturated carboxylic acid or an unsaturated carboxylic acid derivative was not introduced to composition 10, polymerization was unstable, an average particle size of the vinyl chloride polymer particles obtained was large, a rate of coarse particles was high, and many fisheyes were formed.

Comparative Example 2

A vinyl chloride was suspension-polymerized as described for Example 1, except that composition 11 was used as a composition (C). The results are shown in Table 2. Since composition 11 did not contain a compound (B), composition 11 itself had poor hue, the vinyl chloride polymer obtained by suspension polymerization using it had poor hue and many fisheyes were formed. When a 10% aqueous solution of composition 11 was prepared, insolubles were observed in the aqueous solution.

Comparative Example 3

A vinyl chloride was suspension-polymerized as described for Example 1, except that composition 12 was used as a composition (C). The results are shown in Table 2. Since composition 12 did not contain a compound (B), composition 12 itself had poor hue, the vinyl chloride polymer obtained by suspension polymerization using it had poor hue and many fisheyes were formed.

Comparative Example 4

A vinyl chloride was suspension-polymerized as described for Example 1, except that composition 13 was used as a composition (C). The results are shown in Table 2. Since composition 13 contained sorbic acid (a compound which does not contain two or more hydroxy groups bonded to a conjugated double bond) as a compound (B), composition 13 itself had poor hue, the vinyl chloride polymer obtained by suspension polymerization using it had poor hue and many fisheyes were formed. When a 10% aqueous solution of composition 13 was prepared, insolubles were observed in the aqueous solution.

Comparative Example 5

A vinyl chloride was suspension-polymerized as described for Example 1, except that composition 14 was used as a composition (C). The results are shown in Table 2. Since the modified PVA (A) in composition 14 had a less amount of double bonds derived from an unsaturated carboxylic acid or a derivative thereof, polymerization was unstable, an average particle size of the vinyl chloride polymer particles obtained was large, a rate of coarse particles was high, and many fisheyes were formed.

Comparative Example 6

A vinyl chloride was suspension-polymerized as described for Example 1, except that composition 15 was used as a composition (C). The results are shown in Table 2. Since the modified PVA (A) in composition 15 had a more amount of double bonds derived from an unsaturated carboxylic acid or a derivative thereof, the composition itself had poor hue, the vinyl chloride polymer obtained by suspension polymerization using it had poor hue and many fisheyes were formed. When a 10% aqueous solution of composition 15 was prepared, insolubles were observed in the aqueous solution.

Comparative Example 7

A vinyl chloride monomer was suspension-polymerized as described for Example 1, except that composition 16 was used as a composition (C). The results are shown in Table 2. Since composition 16 did not contain a compound (B), composition 16 itself had poor hue, the vinyl chloride polymer obtained by suspension polymerization using it had poor hue and many fisheyes were formed. When a 10% aqueous solution of composition 16 was prepared, insolubles were observed in the aqueous solution.

Comparative Example 8

A vinyl chloride was suspension-polymerized as described for Example 1, except that composition 17 was used as a composition (C). The results are shown in Table 2. Since composition 17 contained a more amount of the compound (B), polymerization was unstable, an average particle size of the vinyl chloride polymer particles obtained was large, a rate of coarse particles was high, and many fisheyes were formed.

Comparative Example 9

A vinyl chloride was suspension-polymerized as described for Example 1, except that composition 19 was used as a composition (C). The results are shown in Table 2. Since composition 19 contained 2,6-di-t-butyl-p-cresol (a compound which does not contain two or more hydroxy groups bonded to a conjugated double bond) as a compound (B), composition 19 itself had poor hue, the vinyl chloride polymer obtained by suspension polymerization using it had poor hue and many fisheyes were formed.

As shown in Examples, in the present invention, a composition (C) containing a modified PVA (A) having double bonds derived from an unsaturated carboxylic acid or a derivative thereof in side chains, and a compound (B) has good hue and excellent water solubility. Since a composition (C) of the present invention has reactive double bonds, it is very useful and has so good hue that has high additional value. By using the composition (C) of the present invention as a dispersion stabilizer for suspension polymerization of a vinyl compound, there can be provided a vinyl polymer with excellent polymerization stability in which an average particle size is small, formation of coarse particles is reduced, and coloring and fisheye formation are inhibited. Industrial utility of the present invention is, therefore, extremely high.

introduced double bond was observed near at 6.0 to 6.5 ppm, and the amount of the double bond was 0.03 mol %. The modified PVA (A) had a viscosity-average polymerization degree of 3500 and a saponification degree of 88 mol %. The powdery composition (C) had a yellow index (YI) of 15.

The powdery composition (C) was dissolved in water to prepare a 6% by mass (100 parts by mass of modified PVA (A) in 1560 parts by mass of water) coating agent. In the aqueous solution, no insolubles were observed. The results are shown in Table 4.

(Production of a Base Paper for Release Paper)

A glassine paper with an air permeability of 100 sec was coated with coating agent 1 using a wire bar in such an amount that the coating amount was to be about 1 g/m$^2$ by dry weight. After coating, the paper was dried at 100° C. for 5 minutes to give a coated paper. The coated paper obtained

TABLE 2

| | Dispersion stabilizer for suspension polymerization | | PVA(E) | | Evaluation results of vinyl chloride polymer particles | | | | |
|---|---|---|---|---|---|---|---|---|---|
| | Type | Charge (ppm/ vinyl chloride) | Polymerization degree | Saponification degree (mol %) | Charge (ppm/ vinyl chloride) | Average particle size (μm) | Particle size distribution 42 mesh-on | 60 mesh-on | Fisheyes (number) | YI |
| Example 1 | Composition 1 | 600 | 2400 | 88 | 360 | 140.4 | A | A | 0 | 26.0 |
| Example 2 | Composition 2 | 600 | 2400 | 88 | 360 | 142.3 | A | A | 0 | 26.2 |
| Example 3 | Composition 3 | 600 | 2400 | 88 | 360 | 136.3 | A | A | 0 | 26.5 |
| Example 4 | Composition 4 | 600 | 2400 | 88 | 360 | 139.9 | A | A | 0 | 25.9 |
| Example 5 | Composition 5 | 360 | 800 | 72 | 600 | 150.3 | B | A | 3 | 25.8 |
| Example 6 | Composition 6 | 600 | 2400 | 88 | 360 | 129.7 | A | A | 0 | 27.9 |
| Example 7 | Composition 7 | 600 | 2400 | 88 | 360 | 118.2 | A | A | 1 | 29.3 |
| Example 8 | Composition 8 | 360 | 800 | 72 | 600 | 166.3 | B | A | 7 | 28.7 |
| Example 9 | Composition 9 | 360 | 800 | 72 | 600 | 171.2 | B | B | 14 | 27.3 |
| Example 10 | Composition 1 | 360 | 2400 | 88 | 600 | 169.5 | B | B | 9 | 26.5 |
| Example 11 | Composition 1 | 600 | — | — | — | 169.1 | B | B | 10 | 26.4 |
| Example 12 | Composition 18 | 360 | 800 | 72 | 700 | 179.2 | B | B | 42 | 26.1 |
| Comparative Example 1 | Composition 10 | 600 | 2400 | 88 | 360 | 221.2 | C | C | 87 | 26.3 |
| Comparative Example 2 | Composition 11 | 600 | 2400 | 88 | 360 | 157.3 | B | A | 150 | 37.9 |
| Comparative Example 3 | Composition 12 | 600 | 2400 | 88 | 360 | 168.8 | B | B | 24 | 36.5 |
| Comparative Example 4 | Composition 13 | 600 | 2400 | 88 | 360 | 156.4 | B | A | 104 | 37.0 |
| Comparative Example 5 | Composition 14 | 600 | 2400 | 88 | 360 | 214.3 | C | C | 77 | 26.4 |
| Comparative Example 6 | Composition 15 | 600 | 2400 | 88 | 360 | 116.6 | B | A | 646 | 37.1 |
| Comparative Example 7 | Composition 16 | 600 | 2400 | 88 | 360 | 160.2 | B | B | 287 | 35.4 |
| Comparative Example 8 | Composition 17 | 600 | 2400 | 88 | 360 | 188.4 | C | B | 255 | 26.1 |
| Comparative Example 9 | Composition 19 | 600 | 2400 | 88 | 360 | 151.4 | B | A | 99 | 35.9 |

Example 13

2 parts by mass of itaconic acid as an unsaturated carboxylic acid and 0.1 parts by mass of propyl gallate as a compound (B) were dissolved in 150 parts by mass of methanol to prepare a solution. To the solution was added 100 parts by mass of a starting PVA (viscosity-average polymerization degree: 3500, saponification degree: 88 mol %) for swelling, and then methanol was removed under reduced pressure. Then, the resulting mixed powder was heated at 105° C. for 4 hours, to provide a powdery composition (C) containing a modified PVA (A) having double bonds derived from itaconic acid in side chains and the compound (B). For the modified PVA (A), a peak of an was treated twice by a supercalender at 70° C. and 400 kg/cm$^2$, to give a base paper for release paper.

(Measurement of an Air Permeability)

An air permeability of the base paper for release paper was measured using an Oken type smoothness air permeability tester in accordance with JIS-P8117 (2009). The results are shown in Table 4.

(Cobb Absorbency Test)

As a measure for water resistance of a base paper for release paper, a 60 sec water absorbency was measured by Cobb method in accordance with JIS-P8140 (1998) using a water absorbency tester (trade name: Gurley Cobb size tester, Kumagai Riki Kogyo Co., Ltd.).

(Evaluation of Silicone Curability)

Using LTC1056L from Dow Corning Toray Co., Ltd. as an addition-type silicone (F) and SRX212 as a platinum catalyst, these were blended such that a ratio of the addition-type silicone (F) to platinum (G) was to be 100/0.007, to prepare a coating solution. The coating solution was applied on the base paper for release paper obtained in a coating solid amount of 1.5 g/m² by a blade coater. In this manner, a silicone layer was formed on the base paper for release paper. Then, it was heated at 110° C. and a time for curing the silicone was measured. Here, a time for curing the silicone is a time (second) required until the silicone layer is not removed at all when the silicone layer was strongly rubbed 10 times with a finger at predetermined time intervals. The results are shown in Table 4.

(Evaluation of Adhesiveness of a Release Layer)

Using LTC1056L from Dow Corning Toray Co., Ltd. as an addition-type silicone (F) and SRX212 as a platinum catalyst, these were blended such that a ratio of the addition-type silicone (F) to platinum (G) was to be 100/0.009, to prepare a coating solution. The coating solution was applied on the base paper for release paper obtained in a coating solid amount of 1.5 g/m² by a blade coater, and it was heated at 110° C. for 90 sec, to produce a release paper in which a release layer (silicone layer) was formed on the base paper for release paper. The release paper obtained was evaluated in accordance with the following criteria. The results are shown in Table 4.

A: Under the conditions of 40° C. and 90% RH, the release paper was left for one week and then the silicone layer was strongly rubbed with a finger. As a result, the silicone layer was not peeled. Under the same conditions, the release paper was left for further one week, and then the silicone layer was strongly rubbed with a finger. As a result, the silicone layer was not peeled.

B: Under the conditions of 40° C. and 90% RH, the release paper was left for one week and then the silicone layer was strongly rubbed with a finger. As a result, the silicone layer was not peeled. However, under the same conditions, the release paper was left for further one week, and then the silicone layer was strongly rubbed with a finger. As a result, the silicone layer was peeled.

C: Under the conditions of 40° C. and 90% RH, the release paper was left for one week and then the silicone layer was strongly rubbed with a finger. As a result, the silicone layer was peeled.

Examples 14 to 21 and Comparative Examples 10 to 13

Coating agents were produced as described for Example 13, except that the types of a starting PVA, the types and the amounts of an unsaturated carboxylic acid or a derivative thereof, the types and the amounts of a compound (B), heating temperatures and heating times were changed. Table 3 shows the production conditions, and Table 4 shows the evaluation results of a coating agent obtained. Performance of a base paper for release paper and a release paper was evaluated as described for Example 1, except that the type of a coating agent was changed. The results are shown in Table 4. Here, for Comparative Examples 12 and 13, insolubles were observed in a coating agent, and therefore, performance of a base paper for release paper or a release paper was not evaluated.

TABLE 3

| | Starting PVA | | | | Unsaturated carboxylic acid or a derivative thereof | | Compound (B) | | Heating conditions | |
|---|---|---|---|---|---|---|---|---|---|---|
| | Viscosity-average polymerization degree | Saponification degree (mol %) | Modified species | Modified amount (mol %) | Type | Amount*[1] (parts by mass) | Type | Amount*[1] (parts by mass) | Temperature (° C.) | Time (h) |
| Example 13 | 3500 | 88 | — | — | Itaconic acid | 2 | Propyl gallate | 0.1 | 105 | 4 |
| Example 14 | 800 | 72 | — | — | Itaconic acid | 0.6 | Propyl gallate | 0.2 | 120 | 4 |
| Example 15 | 1000 | 99.5 | Ethylene | 6 | Fumaric acid | 2.63 | Propyl gallate | 0.2 | 120 | 4 |
| Example 16 | 1700 | 97 | Ethylene | 2 | Fumaric acid | 2.63 | Propyl gallate | 0.2 | 120 | 4 |
| Example 17 | 1000 | 99.5 | Ethylene | 6 | Itaconic acid | 2.95 | Propyl gallate | 0.2 | 120 | 4 |
| Example 18 | 1000 | 99.5 | Ethylene | 6 | Itaconic acid | 11.8 | Propyl gallate | 0.2 | 120 | 4 |
| Example 19 | 1000 | 99.5 | Ethylene | 6 | Itaconic acid | 0.3 | Propyl gallate | 0.2 | 120 | 4 |
| Example 20 | 1700 | 96 | Ethylene | 2 | Itaconic acid | 2.95 | Propyl gallate | 0.2 | 120 | 4 |
| Example 21 | 2400 | 88 | — | — | Citraconic acid | 1.33 | Ascorbic acid | 3 | 120 | 4 |
| Comparative Example 10 | 1000 | 99.5 | Ethylene | 6 | — | — | — | — | — | — |
| Comparative Example 11 | 1700 | 88.0 | — | — | — | — | — | — | — | — |
| Comparative Example 12 | 1000 | 99.5 | Ethylene | 6 | Itaconic acid | 2.95 | — | — | 120 | 4 |
| Comparative Example 13 | 800 | 72 | — | — | Itaconic acid | 2.34 | Sorbic acid | 0.3 | 120 | 4 |

*[1]The amount based on 100 parts by mass of the starting PVA

TABLE 4

Evaluation results of a coating agent

| | Modified PVA (A) | | | | | | |
|---|---|---|---|---|---|---|---|
| | Viscosity-average polymerization degree | Saponification degree (mol %) | Modified species | Modified amount (mol %) | Amount of double bonds (mol %) | Powder YI | Water amount[*2)] (parts by mass) |
| Example 13 | 3500 | 88.0 | — | — | 0.03 | 15 | 1560 |
| Example 14 | 800 | 72.0 | — | — | 0.05 | 16 | 1560 |
| Example 15 | 1000 | 99.3 | Ethylene | 6 | 0.19 | 11 | 1560 |
| Example 16 | 1700 | 97.0 | Ethylene | 2 | 0.13 | 12 | 1560 |
| Example 17 | 1000 | 99.4 | Ethylene | 6 | 0.14 | 10 | 1560 |
| Example 18 | 1000 | 99.0 | Ethylene | 6 | 0.53 | 13 | 1560 |
| Example 19 | 1000 | 99.5 | Ethylene | 6 | 0.01 | 7 | 1560 |
| Example 20 | 1700 | 96.0 | Ethylene | 2 | 0.08 | 10 | 1560 |
| Example 21 | 2400 | 88 | — | — | 0.18 | 17 | 1560 |
| Comparative Example 10 | 1000 | 99.5 | Ethylene | 6 | — | 4 | 1560 |
| Comparative Example 11 | 1700 | 88.0 | — | — | — | 7 | 1560 |
| Comparative Example 12 | 1000 | 99.5 | Ethylene | 6 | 0.14 | 42 | 1560 |
| Comparative Example 13 | 800 | 72 | — | — | 0.08 | 63 | 1560 |

| | Evaluation results of a coating agent | Performance evaluation of a base paper for a release paper | | Performanve evaluation of a release paper | |
|---|---|---|---|---|---|
| | Insolubles in an aqueous solution | Air permeability (sec) | Cobb water absorbency (g/m$^2$) | Silicone curability (sec) | Adhesiveness |
| Example 13 | No | 100,000< | 48 | 70 | A |
| Example 14 | No | 2,700 | 50< | 120 | A |
| Example 15 | No | 100,000< | 23 | 60 | A |
| Example 16 | No | 100,000< | 26 | 60 | A |
| Example 17 | No | 100,000< | 22 | 60 | A |
| Example 18 | No | 100,000< | 30 | 60 | B |
| Example 19 | No | 100,000< | 22 | 80 | B |
| Example 20 | No | 100,000< | 28 | 60 | A |
| Example 21 | No | 100,000< | 49 | 60 | A |
| Comparative Example 10 | No | 100,000< | 22 | 120< | C |
| Comparative Example 11 | No | 100,000< | 40 | 120< | C |
| Comparative Example 12 | Yes | *3) | *3) | *3) | *3) |
| Comparative Example 13 | Yes | *3) | *3) | *3) | *3) |

[*2)]Amount based on 100 parts by mass of a modified PVA (A)
[*3)]means "not measured"

The invention claimed is:

1. A composition (C), comprising:
    a modified polyvinyl alcohol (A) and
    a compound (B), wherein
    the modified polyvinyl alcohol (A) comprises 0.01 mol % or more and less than 2 mol % of double bonds derived from an unsaturated carboxylic acid or a derivative thereof in side chains;
    the compound (B) is a compound having a conjugated double bond and two or more hydroxy groups bonded to the conjugated double bond, or a salt or oxide thereof;
    a content of the compound (B) in the composition (C) is 0.001 parts by mass or more and less than 5 parts by mass based on 100 parts by mass of the modified polyvinyl alcohol (A); and
    the compound (B) is: (i) a compound having two or more hydroxy groups bonded to a carbon constituting an aromatic ring, or a salt or oxide thereof, wherein the compound comprises at least one selected from the group consisting of hydroxybenzenes, phenolic carboxylic acids, phenolic carboxylic acid esters and catechins, or (ii) a compound having two or more hydroxy groups at α- and β-positions in an α,β-unsaturated carbonyl compound, or a salt or oxide thereof.

2. The composition (C) according to claim 1, wherein the modified polyvinyl alcohol (A) has a viscosity-average polymerization degree of 400 or more and less than 5000 and a saponification degree of 65 mol % or more.

3. The composition (C) according to claim 1, wherein the modified polyvinyl alcohol (A) further comprises ethylene units in a main chain; and a content of the ethylene units is 1 mol % or more and 10 mol % or less.

4. The composition (C) according to claim 1, wherein an amount of 1,2-glycol bond in the modified polyvinyl alcohol (A) is less than 1.9 mol %.

5. A method for producing the composition (C) according to claim 1, the method comprising reacting a polyvinyl alcohol (D) with the unsaturated carboxylic acid or a derivative thereof in the presence of the compound (B).

6. A powder consisting of the composition (C) according to claim 1, wherein a yellow index is less than 50.

7. A dispersion stabilizer, comprising the composition (C) according to claim 1.

8. A method for producing a vinyl polymer, the method comprising:
suspension-polymerizing a vinyl compound in the presence of the composition (C) according to claim 1 and a polyvinyl alcohol (E), wherein
one of the modified polyvinyl alcohol (A) and the polyvinyl alcohol (E) is a polyvinyl alcohol with a saponification degree of 77 mol % or more and less than 97 mol % and a viscosity-average polymerization degree of 1500 or more and less than 5000, and
the other one of the modified polyvinyl alcohol (A) and the polyvinyl alcohol (E) is a polyvinyl alcohol with a saponification degree of 65 mol % or more and less than 77 mol % and a viscosity-average polymerization degree of 400 or more and less than 1500.

9. A coating agent consisting of an aqueous solution comprising the composition (C) according to claim 1, and 200 parts by mass or more and 100,000 parts by mass or less of water based on 100 parts by mass of the modified polyvinyl alcohol (A).

10. A method for producing the coating agent according to claim 9, the method comprising:
reacting a polyvinyl alcohol (D) with the unsaturated carboxylic acid or a derivative thereof in the presence of the compound (B) to provide the composition (C) comprising the modified polyvinyl alcohol (A) and the compound (B); and
dissolving the composition (C) in water to produce the coating agent.

11. The coating agent according to claim 9, which is a coating agent for paper.

12. A base paper for release paper produced by coating a paper with the coating agent according to claim 11.

13. A release paper comprising:
the base paper according to claim 12, and
a release layer formed on a surface of the base paper.

14. The release paper according to claim 13, wherein the release layer comprises an addition-type silicone (F) and platinum (G), and
the release layer comprises 0.001 parts by mass or more and 0.05 parts by mass or less of platinum (G) based on 100 parts by mass of the addition-type silicone (F).

15. A composition (C), comprising:
a modified polyvinyl alcohol (A) and
a compound (B), wherein
the modified polyvinyl alcohol (A) comprises 0.01 mol % or more and less than 2 mol % of double bonds derived from an unsaturated carboxylic acid or a derivative thereof in side chains;
the compound (B) is a compound having a conjugated double bond and two or more hydroxy groups bonded to the conjugated double bond, or a salt or oxide thereof;
a content of the compound (B) in the composition (C) is 0.001 parts by mass or more and less than 5 parts by mass based on 100 parts by mass of the modified polyvinyl alcohol (A); and
an amount of 1,2-glycol bond in the modified polyvinyl alcohol (A) is less than 1.9 mol %.

16. The composition (C) according to claim 15, wherein the modified polyvinyl alcohol (A) has a viscosity-average polymerization degree of 400 or more and less than 5000 and a saponification degree of 65 mol % or more.

17. The composition (C) according to claim 15, wherein the modified polyvinyl alcohol (A) further comprises ethylene units in a main chain; and a content of the ethylene units is 1 mol % or more and 10 mol % or less.

18. A powder consisting of the composition (C) according to claim 15, wherein a yellow index is less than 50.

19. A powder, comprising:
a modified polyvinyl alcohol (A) and
a compound (B), wherein
the modified polyvinyl alcohol (A) comprises 0.01 mol % or more and less than 2 mol % of double bonds derived from an unsaturated carboxylic acid or a derivative thereof in side chains;
the compound (B) is a compound having a conjugated double bond and two or more hydroxy groups bonded to the conjugated double bond, or a salt or oxide thereof;
a content of the compound (B) in the powder is 0.001 parts by mass or more and less than 5 parts by mass based on 100 parts by mass of the modified polyvinyl alcohol (A); and
a yellow index of the powder is less than 50.

20. The powder according to claim 19, wherein the modified polyvinyl alcohol (A) has a viscosity-average polymerization degree of 400 or more and less than 5000 and a saponification degree of 65 mol % or more.

* * * * *